US012641690B2

(12) United States Patent
Herter

(10) Patent No.: US 12,641,690 B2
(45) Date of Patent: May 26, 2026

(54) CONTROL MODULE FOR LED MODULE

(71) Applicant: Tridonic GmbH & Co KG, Dornbirn (AT)

(72) Inventor: Jens Herter, Lindau (DE)

(73) Assignee: Tridonic GmbH & Co KG, Dornbirn (AT)

( * ) Notice: Subject to any disclaimer, the term of this patent is extended or adjusted under 35 U.S.C. 154(b) by 100 days.

(21) Appl. No.: 18/560,708

(22) PCT Filed: Jun. 15, 2022

(86) PCT No.: PCT/EP2022/066319
§ 371 (c)(1),
(2) Date: Nov. 14, 2023

(87) PCT Pub. No.: WO2022/268605
PCT Pub. Date: Dec. 29, 2022

(65) Prior Publication Data

US 2024/0260148 A1 Aug. 1, 2024

(30) Foreign Application Priority Data

Jun. 24, 2021 (EP) .................................... 21181352

(51) Int. Cl.
*H05B 45/10* (2020.01)
*F21V 23/00* (2015.01)
(Continued)

(52) U.S. Cl.
CPC ........... *H05B 45/10* (2020.01); *F21V 23/005* (2013.01); *H05B 45/20* (2020.01); *H05B 47/11* (2020.01);
(Continued)

(58) Field of Classification Search
CPC ........ H05B 45/10; H05B 45/20; H05B 45/30; H05B 45/37; H05B 45/48; H05B 47/11;
(Continued)

(56) References Cited

U.S. PATENT DOCUMENTS 8,052,303 B2 * 11/2011 Lo ........................ H05B 45/30 362/249.05
8,299,719 B1 * 10/2012 Moshirnoroozi .... H05B 47/165 315/318
(Continued)

OTHER PUBLICATIONS

PCT/EP2022/066319, International Search Report and Written Opinion dated Oct. 17, 2022, 6 pages.

*Primary Examiner* — Tung X Le
(74) *Attorney, Agent, or Firm* — Andrus Intellectual Property Law, LLP

(57) ABSTRACT

The invention relates to a control module (1) for an LED module (2) with at least one LED (2*a*). The control module (1) is configured for being detachably attached to the LED module (2) such that the control module (1) is electrically connected to the LED module (2) when being detachably attached to the LED module (2). The control module (1) is configured to control light emission of the at least one LED (2*a*) when being detachably attached to the LED module (2). Further, the invention relates to an LED module (2) comprising at least one LED (2*a*). The LED module (2) is configured for detachably attaching a control module (1) to the LED module (2) such that the control module (1) is electrically connected to the LED module (2) and the light emission of the at least one LED (2*a*) is controllable by the control module (1).

12 Claims, 2 Drawing Sheets

(51) Int. Cl.

| | |
|---|---|
| ***H05B 45/20*** | (2020.01) |
| ***H05B 47/11*** | (2020.01) |
| ***H05B 47/115*** | (2020.01) |
| ***H05B 47/19*** | (2020.01) |
| *F21Y 115/10* | (2016.01) |
| *H05B 47/175* | (2020.01) |

(52) U.S. Cl.
CPC ........... *H05B 47/115* (2020.01); *H05B 47/19* (2020.01); *F21Y 2115/10* (2016.08); *H05B 47/199* (2024.01)

(58) Field of Classification Search
CPC .... H05B 47/19; H05B 47/105; H05B 47/119; H05B 47/165; H05B 47/175; H05B 47/199
See application file for complete search history.

(56) References Cited

U.S. PATENT DOCUMENTS

| | | | | |
|---|---|---|---|---|
| 9,945,520 | B2 * | 4/2018 | Jiang | F21K 9/278 |
| 10,602,596 | B2 * | 3/2020 | Bowers | H05B 45/20 |
| 10,616,977 | B2 * | 4/2020 | Newton | H05B 47/19 |
| 2006/0082987 | A1 * | 4/2006 | Dorsey | F21V 33/006 160/10 |
| 2012/0152177 | A1 | 6/2012 | Bourget et al. | |
| 2014/0232288 | A1 * | 8/2014 | Brandes | H05B 45/48 315/250 |
| 2016/0091148 | A1 | 3/2016 | Leung et al. | |
| 2019/0268984 | A1 * | 8/2019 | Song | H02M 3/156 |
| 2022/0341577 | A1 * | 10/2022 | Toffoletto | H01Q 9/0421 |

* cited by examiner

CONTROL MODULE FOR LED MODULE

CROSS REFERENCE TO RELATED APPLICATIONS

The present application is the U.S. national stage application of international application PCT/EP2022/066319 filed Jun. 15, 2022, which international application was published on Dec. 29, 2022 as International Publication WO 2022/268605 A1. The international application claims priority to European Patent Application No. 21181352.2 filed Jun. 24, 2021.

BACKGROUND AND SUMMARY OF THE INVENTION

The invention relates to a control module for an LED module; an LED module comprising at least one LED; and a system comprising such a control module and LED module. The system may be a luminaire.

LED is an abbreviation for the term "light emitting diode" which is a known lighting means.

In the prior art, LEDs (light emitting diodes) are well known to be used as light sources in lighting systems. Such a lighting system may correspond to a luminaire. Usually one or more LEDs are provided in the form of an LED module that may be provided as the light source respectively lighting means in a luminaire or another lighting system. For electrically supplying an LED module an LED driver is used that is configured to provide electrical energy, in particular a current, to the one or more LEDs of the LED module. Thus, in an LED lighting system (e.g. luminaire), the LED module is provided as a light source for providing the light emission of the lighting system and the LED driver is provided as an electrical energy source for providing electrical energy, in particular a current, to the LED module. The LED driver may control the light emission of the LED module by controlling the electrical energy, in particular current, provided to the LED module. The greater the amount of electrical energy (e.g. the greater the average electrical energy during a time period) provided by the LED driver to the LED module, the greater the amount of light respectively the greater the light intensity of the light emitted by the LED module and vice versa. In particular, the greater the current (e.g. the greater the average current during a time period) provided by the LED driver to the LED module, the greater the amount of light respectively the greater the light intensity of the light emitted by the LED module and vice versa.

The LED driver of a lighting system (e.g. luminaire) has to be suited for the specific LED module used as a light source in the lighting system in order to be able to control light emission of the LED module. Thus, in the case of a new LED module type there may be the need of replacing the LED driver or reconfiguring the LED driver. This may be expensive and time consuming. In addition, in case the lighting system (e.g. luminaire) is configured and/or installed such that it is only possible to easily exchange the LED module, the effort of replacing the LED driver of the lighting system may be high. In addition, this may potentially have a negative effect on the lighting system (e.g. there may be the need of damaging a housing of the lighting system for replacing or reconfiguring the LED driver). Further, this may potentially have a negative effect on the installation place of the lighting system (e.g. there may be the need of damaging a wall or ceiling for replacing or reconfiguring the LED driver).

Therefore, it is an object of the invention to provide means that allow overcoming at least one of the above problems and disadvantages. In particular, it is an object of the invention to provide means that allow reducing costs, effort and time needed for exchanging an LED module of a lighting system.

These and other objects, which become apparent upon reading the following description, are solved by the subject-matter of the independent claims. The dependent claims refer to preferred embodiments of the invention.

According to a first aspect of the invention, a control module for an LED module is provided, wherein the LED module comprises at least one LED. The control module is configured for being detachably attached to the LED module such that the control module is electrically connected to the LED module when being detachably attached to the LED module. The control module is configured to control light emission of the at least one LED of the LED module when being detachably attached to the LED module.

The first aspect of the invention allows to put at least some of the intelligence of an LED driver into the control module, wherein this intelligence may be detachably attached to the LED module by detachably attaching the control module to the LED module. As a result, the function of the LED module may be extended from a mere light source to a light source being able to control its light emission when the control module is attached to the LED module.

As a result, when changing the type of LED module of a lighting system, which is not compatible with an LED driver of the lighting system, the LED driver does not need to be changed respectively adapted to the LED module. Instead, merely the control module may be changed respectively adapted to the new LED module type. This may be easily achieved, because the control module is configured to be detachably attached to the LED module.

The passage "replaceably attach" may be used as a synonym for the term "detachably attach". The term "resolvable" may be used as a synonym for the term "detachable". In other words, the control module is configured to be attached to the LED module such that it may be detached again respectively it may be replaced, once it has been attached to the LED module. The control module is configured such that detachably attaching the control module to the LED module causes an electrical connection to be formed between the control module and the LED module. That is, the control module and the LED module may be electrically connected to each other by detachably attaching the control module to the LED module. In particular, the electrical connection formed between the control module and the LED module by detachably attaching the control module to the LED module is disconnected, when detaching the control module from the LED module.

In particular, the control module comprises or corresponds to control means configured for controlling light emission of the at least one LED of the LED module when the control module is detachably attached to the LED module. The control means may correspond to a controller, microcontroller, processor, microprocessor, field-programmable gate array (FPGA), application specific integrated circuit (ASIC) or any combination thereof. The steps performable by the control module, as described in the following, may be performed by the control means.

For controlling the light emission of the at least one LED, the control module may be configured to perform a PWM (pulse-width modulation) control, i.e. a control using a PWM signal as a control signal.

The control module may be configured to control light emission of the LED module according to the DALI standard, DALI-2 standard or any other known standard. In particular, the control module may be configured to control light emission of the LED module according to the IEC 62386 standard. The DALI standard and DALI-2 standard are well known standards in the field of lighting. DALI stands for "digital addressable lighting interface". The DALI standard is also known as "DALI version 1" or "DALI edition 1" and the DALI-2 standard is also known as "DALI version 2" or "DALI edition 2".

In particular, the control module is a field replaceable unit, i.e. field replaceable control module. In particular, the LED module is a field replaceable unit, i.e. field replaceable LED module.

The at least one LED (i.e. the one or more LEDs) of the LED module may correspond to at least one of organic LEDs, inorganic LEDs and any other known LED types. In the case of a plurality of LEDs, the LEDs of the LED module may be electrically connected in series and/or in parallel. The LED module may comprise or correspond to an LED chip comprising the at least one LED. The at least one LED of the LED module may correspond to an LED chip.

In particular, the control module is configured to control electrical energy suppliable from an LED driver to the at least one LED of the LED module, when the LED driver is electrically connected to the LED module and the control module is detachably attached to the LED module. The control module may be configured to control a current suppliable from an LED driver to the at least one LED of the LED module, when the LED driver is electrically connected to the LED module and the control module is detachably attached to the LED module. The current provided by the LED driver may be a constant current.

This allows controlling the light emission of the at least one LED. The greater the amount of electrical energy, in particular the average amount of electrical energy during a time period, supplied to the at least one LED, the greater the amount of light respectively light intensity of the light emitted by the at least one LED and vice versa. The greater the current, in particular the average current during a time period, supplied to the at least one LED, the greater the amount of light respectively light intensity of the light emitted by the at least one LED and vice versa.

The control module, in particular the control means, may be configured to perform a PWM control of the electrical energy, in particular the current, suppliable from the LED driver to the at least one LED. For this the control module may comprise at least one switch for interrupting a current path from the LED driver to the at least one LED, when the LED driver is electrically connected to the LED module. The at least one switch may be at least one transistor (e.g. at least one bipolar junction transistor and/or at least one field effect transistor). For example, during the off-time (time duration between two pulses) of a PWM control signal used for controlling switching of the at least switch, the at least one switch may be in the non-conducting state (off state) and, thus, the current path from the LED driver to the at least one LED may be interrupted. Therefore, during the off-time of the PWM control signal no electrical energy, in particular no current, is provided to the at least one LED from the LED driver. During the on-time (time duration of a pulse) of the PWM control signal, the at least one switch may be in the conducting state (on state) and, thus, the current path from the LED driver to the at least one LED may be present (closed respectively not interrupted). Therefore, during the on-time of the PWM control signal electrical energy, in particular current, is provided to the at least one LED from the LED driver. By changing the frequency, on-time, off-time and/or duty cycle of the PWM control signal, the average amount of electrical energy, in particular average amount of current, provided during a time period from the LED driver to the LED module may be controlled. The duty cycle of the PWM control signal is the ratio of the on-time to the period (inverse of frequency) of the PWM control signal. For example, in case the frequency is kept constant, the greater the duty cycle of the PWM control signal, the longer the at least one switch is in the conducting-state and, thus, the greater the average amount of electrical energy, in particular the greater the average current, provided from the LED driver to the at least one LED and vice versa. The at least one switch may be part or electrically connected to the control means of the control module.

The control module may be configured for being detachably attached to a plane of the LED module, wherein the at least one LED is arranged on the plane. The plane may be a printed circuit board on which the at least one LED is arranged. Thus, the control module may be configured for being detachably attached to a printed circuit board of the LED module, wherein the at least one LED is arranged on the printed circuit board.

The plane, in particular printed circuit board, may be arranged in a housing of the LED module. In this case, the control module may be arranged on the plane in the housing of the LED module via an opening of the housing. The opening of the housing may be covered by a cover.

The control module may comprise attachment means for being detachably attached to the LED module, in particular a plane (e.g. printed circuit board) or housing of the LED module. The attachment means of the control module may be configured to be detachably attached to corresponding attachment means of the LED module for detachably attaching the control module to the LED module. The attachment means of the control module may be configured for attaching the control module to the LED module by means of a click connection, snap connection, slide-in connection, clip connection or any other connection known in the art. In other words, the control module may be configured for being detachably attached to the LED module by means of a click connection, snap connection, slide-in connection, clip connection or any other connection known in the art. In particular, the attachment means of the control module may be configured to be detachably click-connected, snap connected, slide-in connected, clip connection or connected by any other known connection known in the art to corresponding attachment means of the LED module. The attachment means of the control module may be configured to form a form-fit and/or force-fit connection with corresponding attachment means of the LED module for detachably attaching the control module to the LED module. That is, the control module may be configured to be detachably attached to the LED module by a form-fit and/or force fit connection. The above description with regard to attachment means of the control module is correspondingly valid for attachment means of the LED module.

The attachment means of the LED module may be arranged on the plane, in particular printed circuit board, on which the at least one LED is arranged on. Alternatively, the attachment means of the LED module may be arranged on a housing of the LED module.

The control module may be configured for being mechanically connected to the LED module such that the control module is detachably attached to the LED module when being mechanically connected to the LED module.

In other words, the mechanical connection is a disconnectable (detachable respectively resolvable) mechanical connection. Examples of such a mechanical connection comprise a click connection, snap connection, slide-in connection and clip connection. Alternatively or additionally, the control module may be configured for being connected by magnetic force to the LED module such that the control module is detachably attached to the LED module when being connected by magnetic force to the LED module. For this, the attachment means of the control module may comprise or correspond to at least one magnet (e.g. permanent magnet) that may be detachably attached to corresponding attachment means of the LED module, which may comprise a metal part and/or at least one magnet. Alternatively, the attachment means of the control module may comprise or correspond to a metal part that may be detachably attached to corresponding attachment means of the LED module, which may comprise at least one magnet (e.g. permanent magnet).

Optionally, the control module is configured for being mechanically connected to the LED module by a snap connection. That is, the control module may be configured to be snapped-on and snapped-off the LED module. The control module may be configured to be clipped to the LED module.

The control module may comprise at least one plug configured for being (detachably) mechanically and electrically connected to a corresponding socket of the LED module for detachably attaching the control module to the LED module. For this, the LED module may comprise at least one socket. The terms “receptacle”, “female plug” and “female connector” may be used as synonyms for the term “socket”. The term “male connector” may be used as a synonym for the term “plug”. The attachment means of the control module may comprise or correspond the at least one plug. The attachment means of the LED module may comprise or correspond to the at least one socket.

Alternatively or additionally, the control module may comprise at least one socket configured for being (detachably) mechanically and electrically connected to a corresponding plug of the LED module for detachably attaching the control module to the LED module. For this, the LED module may comprise at least one plug. The attachment means of the control module may comprise or correspond the at least one socket. The attachment means of the LED module may comprise or correspond to the at least one plug.

The at least one socket respectively at least one plug of the LED module may be arranged on the plane, in particular printed circuit board, on which the at least one LED is arranged or on the housing of the LED module.

When the control module is detachably attached to the LED module, the control module may be configured to switch the light emission of the at least one LED of the LED module on and off. In addition or alternatively, the control module may be configured to dim the light emission of the at least one LED. In addition or alternatively, in case a color of the light emission of the at least one LED is variable, the control module may be configured to vary the color of the light emission of the at least one LED.

The more the light emission of the at least one LED is dimmed the less light is emitted by the at least one LED and vice versa. That is, the more the light emission of the at least one LED is dimmed, the smaller the amount of light respectively the smaller the light intensity of light emitted by the at least one LED and vice versa.

Optionally, the control module comprises at least one sensor. When the control module is detachably attached to the LED module, the control module may be configured to control the light emission of the at least one LED of the LED module based on a detection result of the at least one sensor. The at least one sensor may comprise or correspond to at least one presence and/or movement detection sensor and/or at least one daylight sensor.

For example, the control module may be configured to switch a light emission of the at least one LED on (light emission takes place), in case the at least one sensor detects presence and/or movement of a person. The control module may be configured to switch a light emission of the at least one LED off (no light emission takes place), in case the at least one sensor detects no presence and/or no movement of a person. Alternatively, instead of switching the at least one LED off, the control module may be configured to dim the light emission of the at least one LED (reduce amount of light respectively light intensity), in case the at least one sensor detects no presence and/or no movement of a person. In case the at least one sensor detects presence and/or movement of a person, the control module may be configured to stop or reduce dimming of the light emission of the at least one LED (increase amount of light respectively light intensity).

Further, the control module may be configured to switch a light emission of the at least one LED on (light emission takes place), in case the at least one sensor detects ambient light below a lighting threshold (e.g. light intensity threshold). The control module may be configured to switch a light emission of the at least one LED off (no light emission takes place), in case the at least one sensor detects ambient light above the lighting threshold (e.g. light intensity threshold). Alternatively, instead of switching the at least one LED off, the control module may be configured to dim the light emission of the at least one LED (reduce amount of light respectively light intensity) dependent on the ambient light intensity, in case the at least one sensor detects ambient light above a lighting threshold (e.g. light intensity threshold). In case the at least one sensor detects ambient light below the lighting threshold (e.g. light intensity threshold), the control module may be configured to stop or reduce dimming of the light emission of the at least one LED (increase amount of light respectively light intensity) dependent on the ambient light intensity.

The at least one sensor may be part or electrically connected to the control means.

Optionally, the control module comprises a communication interface. When the control module is detachably attached to the LED module, the communication interface may be configured to communicate with an LED driver for electrically supplying the LED module when the LED driver is electrically connected to the LED module. In addition or alternatively, the communication interface may be configured to communicate with at least one further external device.

The communication interface may be part or electrically connected to the control means.

The at least one further external device may correspond to a device that is external to the LED module and not electrically connected with the LED module. In particular, the at least one external device may be understood as at least one device that is external to a lighting system (e.g. a luminaire), when the LED module is part of the lighting system.

The communication interface may be configured for a wireless communication and/or wire-bound communication. The communication interface may be configured for a communication according to at least one of the following standards respectively protocols: DALI, DALI-2, Bluetooth, ZIGBEE, Z-Wave, Thread and any other known standard respectively protocol. The control module may comprise at least one antenna. The at least on antenna may be at least one antenna according to the 2.4 GHz technology and/or at least one antenna according to the 5 GHz technology. The at least one antenna may be electrically connected to or be part of the communication interface. This has the advantage that no longer LED drivers comprising an antenna are required for electrically supplying the LED module. Namely, as soon as the control module is detachably attached to the LED module, an antenna may be present at the LED module for wirelessly controlling operation of the LED module (via the control module) from remote. The communication interface allows integration of the LED module into ECO-System, such as Bluetooth-Systems, DALI-Systems, DALI-2-Systems etc., when the control module is detachably attached to the LED module. The control module, in particular the communication interface, may be configured to connect the LED module to an internet lighting management system (e.g. IPv6 internet lighting management system), when the control module is detachably attached to the LED module.

In particular the communication interface is configured to receive information for controlling the light emission of the at least one LED of the LED module. The information may comprise or correspond to at least one parameter for controlling operation of the at least LED. The at least one parameter may correspond to at least one of the following parameters: target electrical energy to be provided to the at least one LED, target current to be provided to the at least one LED, target frequency of a PWM control signal for controlling operation of the at least one LED, target duty cycle of a PWM control signal for controlling operation of the at least one LED, a target dimming level of the light emission of the at least one LED, a target color of the light emission of the at least one LED (in case the at least one LED may emit colored light) etc. The dimming level may be between 0% and 100%, wherein a dimming level of 0% corresponds to no light emission and a dimming level of 100% corresponds to maximum light emission (maximum light intensity) of the at least one LED The greater the dimming level the greater the amount of light respectively the greater the light intensity of the light emission of the at least one LED (the less dimming) and vice versa.

The information receivable by the communication interface may comprise or correspond to at least one of the following: maximum allowable dimming range, maximum allowable light intensity of the light emission of the at least one LED, maximum allowable electrical energy for the at least one LED, maximum allowable current for the at least one LED etc. Further, the information (receivable by the communication interface) may comprise or correspond to configuration information respectively commissioning information for configuration of the LED module when the control module is detachably attached to the LED module. The configuration respectively commissioning information may comprise or correspond to at least one of the following: an address (e.g. an IP-address respectively identification IP address) for addressing the LED module, an identifier for identifying the LED module among a plurality of light sources (e.g. LED modules), location information of the LED module (to which the control module may be attached to) etc. The location information may indicate an absolute position or a reference position (e.g. with regard to a central control unit). The identifier may be a group identifier grouping the LED module to a group of LED modules. This allows controlling the LED module and other LED modules that are grouped together as a group (i.e. they are controlled the same). The information may comprise or correspond to any other information known for controlling operation of at least one LED.

The control module, in particular control means, may be configured to control, based on information received by the communication interface, the light emission of the at least one LED of the LED module, when being detachably attached to the LED module. For example, the control module may be configured to flexibly set diming levels of the light emission of the at least one LED based on the information received by the communication interface.

The communication interface may be configured to communicate any of the above information to the LED driver or any further external device. For example, the control module may control electrical energy, in particular current, supplied from the LED driver to the at least one LED module by communicating corresponding information via the communication interface to the LED driver. The communication interface may be configured to communicate detection results (respectively data) of the at least one optional sensor of the control module to the LED driver or any further external device The control means, the at least one optional sensor and the optional communication interface may be arranged in a housing of the control module.

The control module may be configured to store information with regard to the LED module. Optionally, the information may comprise or correspond to configuration information with regard to the LED module.

The information with regard to the LED module may be stored in the control module before detachably attaching the control module to the LED module. The control module may comprise a data storage for storing the information, optional configuration information, with regard the LED module. The information may be used for configuring respectively commissioning the LED module. In particular, a pre-configuring may be performed in a laboratory. The information may comprise addresses, such as IP addresses. The information may be as outlined above with regard to the information that may be received and communicated by the communication interface. The data storage may be electrically connected or be part of the control means of the control module. The control means may be configured to read and/or write data to the data storage.

The control means, the at least one optional sensor, the optional communication interface and the optional data storage may be electrically connected via a bus, in particular data bus, to each other. The bus may be a wired bus.

In particular, the control module is configured for being electrically supplied from the LED module when being detachably attached to the LED module.

The control module may be configured to be detachably attached to the LED module such that the control module is part of a current circuit of the LED module comprising the at least one LED when being detachably attached to the LED module. Thus, the control module may be electrically supplied from the LED driver, when the control module is detachably attached to the LED module and the LED driver is electrically connected to the LED module for electrically supplying the current circuit of the LED module. In particular, the control module is configured to control electrical energy, in particular current, provided via the current circuit of the LED module to the at least one LED of the LED module, when the control module is detachably attached to the LED module. The current circuit may also be referred to as electrical supply circuit. The components of the control module may be electrically supplied from the LED module, when the control module is detachably attached to the LED module. In particular, the control means, the at least one optional sensor, the optional communication interface and the optional data storage are configured to be electrically supplied from the LED module when the control module is detachably attached to the LED module.

In order to achieve the control module according to the first aspect of the invention, some or all of the above described optional features may be combined with each other.

According to a second aspect of the invention, an LED module comprising at least one LED for light emission is provided. The LED module is configured for detachably attaching a control module to the LED module such that the control module is electrically connected to the LED module and the light emission of the at least one LED is controllable by the control module when the control module is detachably attached to the LED module. Optionally, the control module is a control module according to the first aspect of the invention, as described above.

The above description with regard to the control module according to the first aspect of the invention is also valid for the LED module according to the second aspect of the invention. In particular, the above description of the LED module, to which the control module according to the first aspect of the invention may be detachably attached to, is also valid for the LED module according to the second aspect of the invention.

The LED module according to the second aspect of the invention achieves the same advantages as the control module according to the first aspect of the invention.

In particular, the LED module is configured for being electrically connected to an LED driver such that electrical energy suppliable to the at least one LED from the LED driver is controllable by the control module, when the LED module is electrically connected to the LED driver and the control module is detachably attached to the LED module. The LED module may be configured for being electrically connected to an LED driver such that a current suppliable to the at least one LED from the LED driver is controllable by the control module, when the LED module is electrically connected to the LED driver and the control module is detachably attached to the LED module. The electrical connection between the LED module and the LED driver may be a detachable respectively resolvable electrical connection. Thus, the LED module may be configured to be detachably respectively resolvably connected to the LED driver. For this, the LED module may comprise a plug or socket that may be electrically connected to a socket respectively plug of the LED driver. The current provided by the LED driver may be a constant current.

The LED module may comprise a plane on which the at least one LED is arranged, wherein the plane is configured for detachably attaching the control module to the plane. In particular, the plane may be a printed circuit board, on which the at least one LED is arranged. Thus, the LED module may comprise a printed circuit board on which the at least one LED is arranged, wherein the printed circuit board is configured for detachably attaching the control module to the printed circuit board.

In particular, the LED module is configured for mechanically connecting the control module to the LED module such that the control module is detachably attached to the LED module when being mechanically connected to the LED module.

Optionally, the LED module is configured for mechanically connecting the control module to the LED module by a snap connection. The LED module may be configured as outlined above with regard to the first aspect of the invention for detachably connecting, in particular mechanically and electrically connecting, the control module to the LED module.

The LED module may be configured to electrically supply the control module with electrical energy provided by an LED driver when the control module is detachably attached to the LED module and the LED module is electrically connected to the LED driver.

In particular, the LED module may be configured to detachably attach the control module to the LED module such that the control module is part of a current circuit of the LED module via which the at least one LED is electrically suppliable from the LED driver, when the LED driver is electrically connected to LED module and the control module is detachably attached to the LED module.

Optionally, the LED module comprises at least one antenna, wherein the at least one antenna is arranged on a plane of the LED module on which the at least one LED is arranged. The plane may be a printed circuit board on which the at least one LED is arranged. The LED module may be configured for detachably attaching the control module such that the control module is electrically connected to the at least one antenna and is configured to wirelessly communicate via the at least one antenna when being detachably attached to the LED module.

This has the advantage that no longer LED drivers comprising an antenna are required for electrically supplying the LED nodule. Moreover, since the antenna is already present on the LED module, the antenna is already arranged at a position that is suitable for wireless communication. Therefore, an arrangement respectively installation of LED drivers is not limited to places and a way that are suitable for wireless communication, because the antenna is present in the LED module and, thus, does not need to be present anymore in the LED driver.

The at least one antenna may be implemented according to the 2.4 GHz technology and/or the 5 GHz technology.

In order to achieve the LED module according to the second aspect of the invention, some or all of the above described optional features may be combined with each other.

According to a second aspect of the invention, a system is provided. The system comprises a control module according to first aspect of the invention, as described above; and an LED module according to the second aspect of the invention, as described above. The control module is configured for being detachably attached to the LED module such that the control module is electrically connected to the LED module when being detachably attached to the LED module. The control module is configured to control the light emission of the at least one LED when being detachably attached to the LED module. The system may be referred to as lighting system. Optionally, the system of the third aspect is a luminaire.

The above description with regard to the control module according to the first aspect of the invention and the above description with regard to the LED module according to the second aspect of the invention is also valid for the system according to the third aspect of the invention.

The system according to the third aspect of the invention achieves the same advantages as the control module according to the first aspect of the invention.

The control module according to the first aspect of the invention and the LED module of the second aspect of the invention provide several advantages, as outlined in the following. A modular LED module, in particular field replaceable LED module, may be provided whose operation may be easily changed in a cost effective way. Namely, by changing respectively replacing the type of control module according to the first aspect that may be detachably attached to the LED module the functionality and configuration of the LED module may be changed. Since the control module is detachably attached to the LED module, no change of the LED module is required for changing respectively replacing the control module.

When the LED module according to the second aspect needs to be replaced by a new LED module according to the second aspect because of malfunction, a configuration respectively commissioning of the new LED module does not need to be carried out, because the control module may store information regarding the LED module. Thus, the information used for controlling operation of the LED module and/or commissioning the LED module is already there and may be easily used for controlling operation of the new LED module by just detachably attaching the control module to the new LED module. For example, in case the malfunctioning LED module was part of a control group of LED modules that are controlled in the same way, the new LED module may automatically become part of the group when detachably attaching to the new LED module the control module storing said information. In other words, the control module and, thus, the information regarding the malfunctioning LED module stored by the control module may be reused for the new LED module.

A regrouping of LED modules according to the second aspect may be easily performed (without using any software), by detachably attaching a control module corresponding to a desired group (in particular storing corresponding group identifier information) to each LED module of the LED modules that is to be grouped in the desired group.

In case a new type of LED module according to the second aspect is being used instead of a previous LED module according to the second aspect, the LED driver used for electrically supplying the previous LED module may be still used for the new LED module without the need of adapting the LED driver. Namely, the LED driver is electrically connected to the LED module for electrically supplying the LED module, that is for providing electrical energy, in particular current, to the LED module as an electrical energy source. This is independent of the type of LED module. The control of the operation of the LED module, which depends on the type of LED module, may be performed by the control module of the first aspect of the invention, when the control module is detachably attached to the LED module. The control module may control the operation of the LED module and, thus, its light emission by controlling the amount of electrical energy, in particular current, that is provided from the LED driver to the at least one LED of the LED module, when the control module is detachably attached to the LED module, as outlined already above. Therefore, the control module according to the first aspect and the LED module according to the second aspect allow easily changing the type of LED module according to the second aspect that is used in a lighting system. Namely, neither the LED module nor any LED driver (used in the lighting system as electrical energy supply respectively source) need to be adapted for this. It is sufficient to detachably attach a control module suited for the type of LED module used in the lighting system to the LED module allowing control of operation of the LED module.

In other words, the intelligence for operating LED module (s) of a lighting system is moved from the LED driver(s) of the lighting system to the control module according to the first aspect. Therefore, adaption of a lighting system, such as changing type of LED module(s) or changing operation of the LED module(s) does not require any changes on the LED drivers, which may be complicated and result in high costs, especially in case of a plurality of LED drivers. Instead, it is sufficient to detachably attach a control module according to the first aspect of the invention to the respective LED module, wherein the control module is suited for the LED module, in particular configured for operating the LED module.

Further, in case of an existing lighting system comprising one or more LED modules according to the second aspect of the invention, it is possible to configure the one or more LED modules to communicate with each other according to a new communication standard respectively protocol by detachably attaching to each of the one or more LED modules a corresponding control module according to the first aspect of the invention that is configured for communicating according to the new communication standard respectively protocol.

Furthermore, the control module according to the first aspect and the LED module according to the second aspect allow deciding the type of communication of a lighting system at any time and, thus, there is no need to decide thereon already when planning the lighting system. For example, when the lighting system and, thus, the LED driver(s) and LED module(s) according to the second aspect of the lighting system are already installed, e.g. in a building or outdoor area, and are ready for function, the type of communication of the lighting system may be decided by detachably attaching to the LED module(s) a corresponding control module according to the first aspect that is configured for the desired type of communication. Thus, during the lifetime of an LED module according to the second aspect the tape of communication with other devices may be changed and adapted to new communication standards respectively protocols. For this, merely a control module according to the first aspect configured to communicate according to the new communication standard(s) is to be detachably attached to the LED module. As a result, LED modules, that are still functioning, do not need to be replaced because they are not suited for new standards or protocols.

The configuration respectively commissioning of LED modules according to the second aspect may be performed already in advance (e.g. in a laboratory respectively factory) before installing the LED modules in the field. For this, for each of the LED modules a corresponding control module according to the first aspect may be configured, in particular provided with respective information. Then, the preconfigured control modules may be detachably attached to the LED modules at the place of installation of the LED modules. By detachably attaching a control module to an LED module the LED module becomes automatically configured respectively commissioned depending on the information respectively data stored on the control module (i.e. depending on the pre-configuration of the control module). As a result, in the field (e.g. construction side respectively in a building) at the place of installation of an LED module, there is no need of a configuration or commissioning of the LED module. This is overcome by detachably attaching to the LED module a corresponding control module according to the first aspect that is already preconfigured accordingly.

That is, the information (e.g. parameters) for controlling operation of the LED module may be already preconfigured and stored in the control module.

Control algorithms, in particular feedback control algorithms, usable by a control module according to the first aspect may correspond to known ones (e.g. PWM control algorithms for controlling dim level) used in LED drivers. However, according to the invention they are not to be used in the LED driver(s) of a lighting system, but instead in the control module(s) according to the first aspect that may be detachably attached to LED module(s) according to the second aspect of the lighting system. That is, the LED driver(s) are merely used for electrical energy supply.

Furthermore, for the reasons outlined above, simple and cheap LED drivers may be used for electrically supplying LED module(s) of the second aspect. Namely, the control of the light emission of the LED module(s) may be performed by corresponding control module(s) according to the first aspect, when they are detachably attached to the LED module(s) respectively.

The control module according to the first aspect of the invention may add control function and connection (communication) function to the LED module according to the second aspect of the invention, as outlined above. That is, the LED module may be configured (e.g. re-configured) by detachably attaching the control module to the LED module. Therefore, for configuring the LED module no installation of software in the field is required. Thus, it is very easy for the end user to exchange or update LED modules (according to the second aspect) and keep their setup.

The above advantages of the control module according to the first aspect of the invention and the LED module according to the second aspect of the invention are correspondingly valid for the system of the third aspect.

In the above description regarding a system respectively lighting system, the system respectively lighting system may be a luminaire.

BRIEF DESCRIPTION OF THE DRAWINGS

In the following, the invention is described exemplarily with reference to the enclosed figures, in which.

DETAILED DESCRIPTION OF THE PREFERRED EMBODIMENT

In the figures, corresponding elements have the same reference signs. The proportions and dimensions of the elements shown in the figures do not represent the control module and the LED module to scale, but are merely chosen to describe the structure and function of these.

Figure 1:
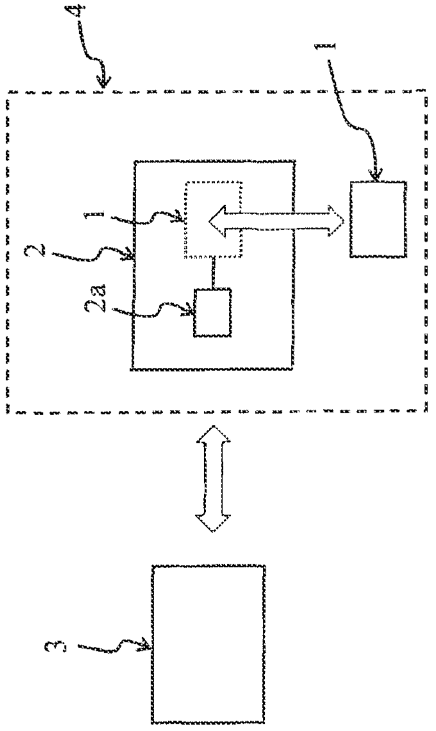
FIG. 1 is a schematic block diagram of a system comprising a control module according to an embodiment of the invention and an LED module according to an embodiment of the invention.

FIG. 1 is a schematic block diagram of a system comprising a control module according to an embodiment of the invention and an LED module according to an embodiment of the invention. In particular, FIG. 1 shows an example of the control module according to the first aspect of the invention and an example of the LED module according to the second aspect of the invention.

The LED module 2 may comprise one LED 2*a*. This is only by way of example and not limiting the present disclosure. Thus, the LED module 2 may comprise one or more LEDs 2*a*, wherein a plurality of LEDs may be electrically connected in parallel and/or in series. The LED module 2 may comprise or correspond to an LED chip comprising the one or more LEDs 2*a*. The one or more LEDs 2*a* may correspond to an LED chip. Further, as indicated in FIG. 1 by a dashed box, the LED module 2 is configured for detachably attaching a control module 1 to the LED module 2, such that the control module is electrically connected to the LED module 2, in particular to the one or more LEDs 2*a*, when being detachably attached to the LED module 2. The control module 1 is configured to control light emission of the LED module, in particular of the one or more LEDs 2*a*, when being detachably attached to the LED module 2 and, thus, being electrically connected with the LED module, in particular the one or more LEDs 2*a*.

The LED module 2 is configured to be electrically connected to an LED driver 3 for being electrically supplied with electrical energy, in particular current, from the LED driver 3. In particular, the LED driver 3 may be electrically connected with the LED module 2 for electrically supplying the one or more LEDs 2 of the LED module 2 with electrical energy, in particular current. In particular, the one or more LEDs 2*a* are electrically suppliable via a current circuit of the LED module 2 from the LED driver 3, when the LED driver 3 and the LED module are electrically connected to each other. The control module 1 may be configured to control the electrical supply from the LED driver 3 via the current circuit to the one or more LEDs 2*a* for controlling the light emission of the one or more LEDs 2*a* when being detachably attached to the LED module 2. The electrical connection between the LED driver 3 and the LED module 2 may be detachable. The control module 1 may be configured to be detachably attached to the LED module 2 such that it becomes part of the current circuit of the LED module 2 when being detachably attached to the LED module 2. The control module 1 may be electrical supplied via the current circuit of the LED module 2 from the LED driver 3, when being detachably attached to the LED module 2 and the LED driver 3 being electrically connected to the LED module 2.

The control module 1 may be configured to control operation of the LED module and, thus, light emission of the one or more LEDs 2*a* according to the DALI standard, DALI-2 standard or any other known standard used for lighting control.

In particular, when the control module 1 is detachably attached to the LED module 2, the control module 1 is configured to switch the light emission of the one or more LEDs 2*a* of the LED module 2 on and off, dim the light emission of the one or more LED 2*a*, and/or in case a color of the light emission of the one or more LED 2*a* is variable, vary the color of the light emission of the one or more LED 2*a*. For this, the control module 2 is configured to control the electrical energy, in particular current, that is provided to the one or more LEDs 2*a* when being detachably attached to the LED module 2. In particular, the control module 2 is configured to control the electrical energy, in particular current, that is provided to the one or more LEDs 2*a* from the LED driver 3, when the LED driver 3 is electrically connected with the LED module 2 and the control module 1 is detachably attached to the LED module 2.

Optionally, the control module 1 comprises at least one sensor (e.g. at least one presence and/or movement detection sensor, at least one daylight sensor and/or any other known sensor(s)). When the control module 1 is detachably attached to the LED module 2, the control module 1 may be configured to control the light emission of the one or more LEDs 2*a* of the LED module 2 based on a detection result of the at least one sensor (not shown in FIG. 1).

Optionally, the control module 1 may comprise a communication interface, wherein when the control module 1 is detachably attached to the LED module 2, the communication interface is configured to communicate with the LED driver 3 for electrically supplying the LED module 2 when the LED driver 3 is electrically connected to the LED module 2 and/or at least one further external device (not shown in FIG. 1).

The communication may be wire-bound and/or wireless. For example, the communication may be according to DALI, DALI-2 or any other known standard. The wireless communication may be a Bluetooth communication or any other known wireless communication.

The control module 1 is configured for being electrically supplied from the LED module 2 when being detachably attached to the LED module 2. In particular, the control module 1 may be configured to be detachably attached to the LED module 2 such that it may be electrically supplied from the LED driver 3, when the LED driver 3 is electrically connected with the LED module 2 and the control module 1 is detachably attached to the LED module 2.

For detachably attaching the control module 1 to the LED module 2, the control module 1 and the LED module 2 may be configured as outlined already above with regard to the control module of the first aspect and the LED module of the second aspect of the invention.

For further details of the control module 1 and the LED module 2 of FIG. 1 reference is made to the above description of the control module according to the first aspect of the invention and the LED module according to the second aspect of the invention.

As indicated in FIG. 1, the control module 1 and the LED module 2 may form a system 4. The system 4 may be a luminaire. The system 4 may optionally comprise the LED driver 3.

Figure 2:
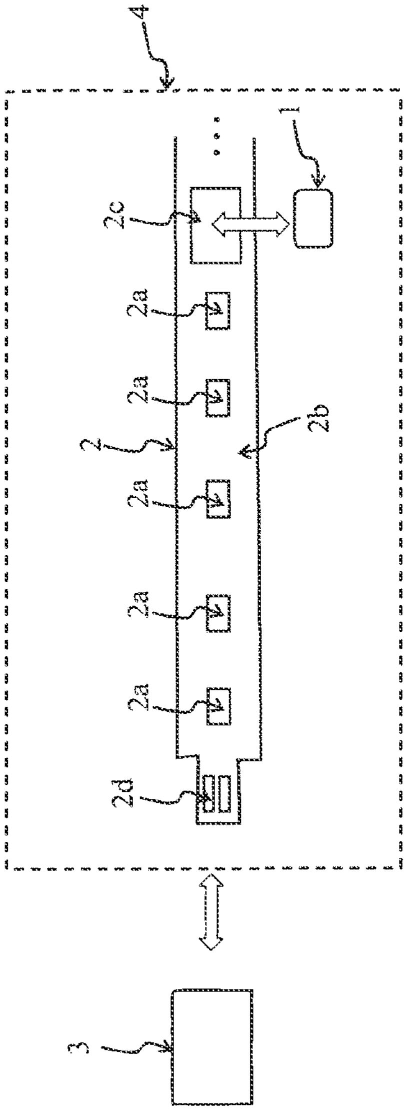
FIG. 2 schematically shows the system of FIG. 1 with an example of an implementation form of the LED module.

FIG. 2 schematically shows the system of FIG. 1 with an example of an implementation form of the LED module. The LED module of FIG. 2 is an implementation form of the LED module of FIG. 1. The above description of FIG. 1 is correspondingly valid for FIG. 2, in particular the control module and LED module of FIG. 2, and in the following mainly the implementation form of the LED module of FIG. 2 is described.

As shown in FIG. 2, the LED module 2 may comprise a plurality of LEDs 2*a* (e.g. five LEDs). The number of LEDs 2*a* shown in FIG. 2 is only by way of example and may be different. The LEDs 2*a* of the LED module 2 may be arranged on a plane 2*b*, in particular a printed circuit board 2*b*, of the LED module 2. The plane 2*b* may be flexible, in particular a flexible circuit board. In this case, the LED module 2 may correspond to a flexible LED strip. The LED module 2 is not limited to this kind of module and may be any other known type of LED module.

As indicated in FIG. 2, the LED module 2, in particular the plane 2*b* (e.g. printed circuit board) on which the LEDs 2*a* are arranged, may be configured such that the control module 1 is arranged on the plane 2*b*, when the control module 1 is detachably attached to the LED module 2. The control module 1 may be arranged on the plane 2*b* of the LED module 2 by being detachably attached respectively fixed on the plane 2*b*. For this, the LED module 2 may comprise a socket or plug 2*c* arranged on the plane 2*b*, wherein a corresponding plug respectively socket of the control module 1 may be mechanically and electrically connected (detachably) to the socket or plug 2*c* of the LED module 2 for detachably attaching the control module 1 to the LED module 2. The control module 1 may be detachably attached to the LED module 2*a* by other means, as described above.

As shown in FIG. 2, the LED module 2 may comprise one or more electrical connectors 2*d* for electrically connecting the LED module 2 to the LED driver 3. The one or more connectors 2*d* may be arranged on the plane 2*b* (e.g. printed circuit board) on which the LEDs 2*a* are arranged on. The LED module 2 may comprise at least one antenna (not shown in FIG. 2). The at least one antenna may be arranged on the plane 2*b* (e.g. printed circuit board) on which the LEDs 2*a* are arranged on. The LED module 2 may be configured for detachably attaching the control module 1 such that the control module 1 is electrically connected to the at least one antenna and is configured to wirelessly communicate via the at least one antenna when being detachably attached to the LED module 2.

For further details of the control module 1 and the LED module 2 of FIG. 2 reference is made to the above description of the control module according to the first aspect of the invention, the LED module according to the second aspect of the invention and the above description of FIG. 1.

All steps which are performed by the various entities described in the present disclosure as well as the functionalities described to be performed by the various entities are intended to mean that the respective entity is adapted to or configured to perform the respective steps and functionalities. In the claims as well as in the description the word “comprising” does not exclude other elements or steps and the indefinite article “a” or “an” does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A control module (1) for an LED module (2) with at least one LED (2*a*) on a printed circuit board, wherein the control module (1) comprises attachment means for detachably attaching to the LED module (2) on the printed circuit board at an electrical contact on the LED module (2) that is different from an electrical contact in the LED module (3) for an LED driver (3) such that the control module (1) is electrically connected to the LED module (2) when detachably attached to the LED module (2);

the control module (1) is configured to control light emission of the at least one LED (2*a*) when detachably attached to the LED module (2); and the control module (1) is configured to control the current of an electrical supply circuit from the LED driver (3) to the at least one LED (2*a*) of the LED module (2) via pulse width modulation of at least one switch in the electrical supply circuit, when the LED driver (3) is electrically connected to the LED module (2) and the control module (1) is detachably attached to the LED module (2).

2. The control module (1) according to claim 1, wherein said at least one switch are part of the control module.

3. The control module (1) according to claim 1, wherein the printed circuit board defines a plane (2*b*) and the at least one LED (2*a*) is arranged on the plane (2*b*).

4. The control module (1) according to claim 1, wherein, when the control module (1) is detachably attached to the LED module (2), the control module (1) is configured to switch the light emission of the at least one LED (2*a*) of the LED module (2) on and off, dim the light emission of the at least one LED (2*a*), and/or in case a color of the light emission of the at least one LED (2*a*) is variable, vary the color of the light emission of the at least one LED (2*a*).

5. The control module (1) according to claim 1, comprising at least one sensor, which is at least one presence sensor and/or movement detection sensor and/or at least one daylight sensor, wherein when the control module (1) is detachably attached to the LED module (2), the control module (1) is configured to control the light emission of the at least one LED (2*a*) of the LED module (2) based on a detection result of the at least one sensor.

6. The control module (1) according to claim 1, comprising a communication interface, wherein when the control module (1) is detachably attached to the LED module (2), the communication interface is configured to communicate with the LED driver (3) for electrically supplying the LED module (2) when the LED driver (3) is electrically connected to the LED module (2), and/or at least one further external device.

7. The control module (1) according to claim 1 comprising a memory configured to store configuration and commissioning information with regard to the LED module (2).

8. The control module (1) according to claim 1, wherein the control module (1) is configured to receive electrical power from the LED module (2) when detachably attached to the LED module (2).

9. The LED module (2) comprising the at least one LED (2*a*) for light emission, wherein the LED module (2) comprises a socket on the printed circuit board for detachably attaching the control module (1) of claim 1 to the LED module (2) such that the control module (1) is electrically connected to the LED module (2) and the light emission of the at least one LED (2*a*) is controllable by the control module (1) when the control module (1) is detachably attached to the LED module (2).

10. The LED module (2) according to claim 9, wherein the LED module (2) is configured to be electrically connected to the LED driver (3) such that the current supplied to the at least one LED (2*a*) from the LED driver (3) is controlled by the control module (1), when the LED module (2) is electrically connected to the LED driver (3) and the control module (1) is detachably attached to the LED module (2).

11. The LED module (2) according to claim 9 is configured to electrically supply the control module (1) with electrical energy provided by the LED driver (3) when the control module (1) is detachably attached to the LED module (2) and the LED module (2) is electrically connected to the LED driver (3).

12. The LED module (2) according to claim 9 comprising at least one antenna, wherein the at least one antenna is arranged on the printed circuit board the LED module (2) on which the at least one LED (2*a*) is arranged, and the LED module (2) is configured to detachably attach the control module (1) such that the control module (1) is electrically connected to the at least one antenna and is configured to wirelessly communicate via the at least one antenna when being detachably attached to the LED module (2).

* * * * *